B. L. STOWE.

Assignor to J. VAN D. REED.

BELTING.

No. 10,777. Reissued Nov. 2, 1886.

ATTEST.

J. Henry Kaiser

E. A. Dick

INVENTOR.

Benjamin L. Stowe,

By Marcellus Bailey his attorney.

UNITED STATES PATENT OFFICE.

BENJAMIN L. STOWE, OF BROOKLYN, ASSIGNOR TO J. VAN D. REED, OF NEW YORK, N. Y.

BELTING.

SPECIFICATION forming part of Reissued Letters Patent No. 10,777, dated November 2, 1886.

Original No. 321,154, dated June 30, 1885. Application for reissue filed September 29, 1886. Serial No. 214,878.

*To all whom it may concern:*

Be it known that I, BENJAMIN L. STOWE, of Brooklyn, Kings county, New York State, have invented a new and useful Improvement in Belting, of which the following is a specification.

My invention relates to knit-fabric belting, and is directed to means for protecting the edges of such belting from wear, due to the contact therewith of the shipper-forks ordinarily employed for shifting belts from one pulley to another. To this end I incorporate with the body of a solid knit-fabric belt separate projecting knit-fabric edges, which receive all the friction and consequent wear that the belt would otherwise be liable to receive from shipper-forks, and which are independent of the belt in the sense that they may be worn away and destroyed without injuring the integrity of the main body of the belt, the latter being in the meanwhile itself fully protected from injury arising from the cause above referred to.

Figure 1:
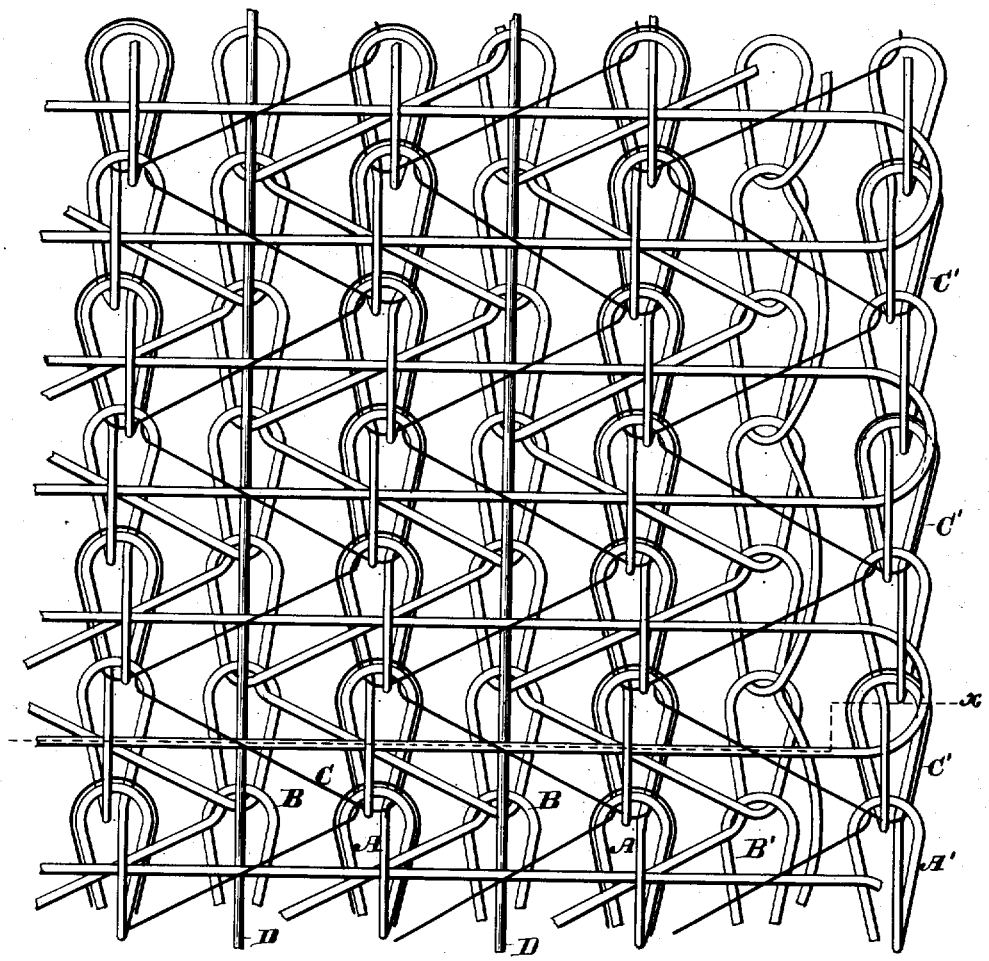
Figure 2:
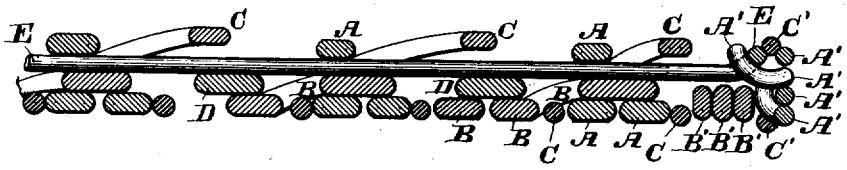

In the accompanying drawings, Figure 1 is a face view, on a greatly enlarged scale, of a portion of a belt embodying my improvement in the preferred form. This belt is a solid knit belt, and on each edge (one only being shown) it has a projecting edge knit simultaneously with the knitting of the belt itself. Fig. 2 is a section of the same on line *x x*, Fig. 1.

In the actual web or fabric the strands are of course packed closely together. They are, however, represented in the drawings enlarged and widely separated, in order that the structure of the fabric may be more readily discerned. In the face view, Fig. 1, the fabric, for convenience of illustration, is represented as developed or spread out at the projecting edge; but in the actual fabric each projecting edge is rolled up partly onto itself, as seen in Fig. 2, being caused to assume this position by the draft or tension upon the weft.

In the body of the knit fabric shown there are three sets of warp-threads, A, B, and C. The two warps A and C are worked by a set of horizontal needles, and the warps B are worked by a set of vertical needles, and the guide for these threads B has a longitudinal reciprocatory motion equal to the distance from one needle to the second one from it, said guide supplying a separate warp-thread to each needle, and each warp-thread being fed alternately to one or the other of two contiguous vertical needles. Warps A are fed to their needles by a similar guide-bar, but one that has sufficient motion only to feed an individual warp to one and the same needle for each stitch. Warps C, which are small binding-warps, are fed to the horizontal needles by a guide which feeds a warp alternately to one or the other of two contiguous needles.

D are straight longitudinal strands laid in the fabric during the process of knitting. E is the weft.

Having indicated in a general way the structure of the body of the belt, which is similar to that described in my Letters Patent No. 321,153, of June 30, 1885, I come now to the feature in which my improvement is found. Each edge of the fabric belt (only one edge being shown) consists of an additional row of looped stitches, A′, similar to stitches A in the body of the fabric; but, unlike the latter, they are not connected directly to or interlaced with the stitches B, but are connected to the fabric only by the weft or filling E, which passes through them, and by the small binder-warp C′, which is knitted into each alternate looped stitch A′. These stitches A′, forming an edge extending beyond the body of the belt, are caused to assume the position shown in Fig. 2 by drawing in the weft E at the points where it passes through them sufficiently to cause them to fold over upon the adjoining row of stitches B′, and to fully protect all other parts of the weft. I remark that on each edge the outer row of stitches, B′, of the main body of the belt are so manipulated that they will, in the absence of the projecting edge A′, form in effect a selvage, as shown. The stitches A′, incorporated with the body of the belt during the process of manufacture, form what I term a "separate projecting edge," in the sense that it can be worn away and destroyed without impairing the integrity of the body of the belt.

The weft E is comparatively safe from wear. The small binder-warp C′, which enters alternate loops or stitches A′, will be worn away with the loops into which it enters; but as the office of said warp is merely to prevent the stitches A′ from raveling it will at such time have already served its purpose.

The edges may be treated with rubber, oil, paint, or other substance that will increase their resistance to friction.

What I claim herein as new and of my own invention is—

1. A solid knit-fabric belt having incorporated therewith separate projecting knit-fabric edges, as and for the purposes hereinbefore set forth.

2. A solid knit selvaged fabric belt having incorporated therewith separate projecting knit-fabric edges external to the selvages, as and for the purposes hereinbefore set forth.

In testimony whereof I have hereunto set my hand this 21st day of September, 1886.

BENJAMIN L. STOWE.

Witnesses:

FREDERICK A. STOWE,

EDWARD HANLON.